United States Patent
Achenbach

(10) Patent No.: US 8,104,782 B2
(45) Date of Patent: Jan. 31, 2012

(54) SLIDER TUBE UNIT FOR A SUSPENSION FORK

(75) Inventor: Martin Achenbach, Biel (CH)

(73) Assignee: DT Swiss Inc., Grand Junction, CO (US)

( * ) Notice: Subject to any disclaimer, the term of this patent is extended or adjusted under 35 U.S.C. 154(b) by 148 days.

(21) Appl. No.: 12/607,590

(22) Filed: Oct. 28, 2009

(65) Prior Publication Data

US 2010/0102530 A1  Apr. 29, 2010

(30) Foreign Application Priority Data

Oct. 29, 2008 (DE) .......................... 10 2008 053 700

(51) Int. Cl.
*B62K 21/02* (2006.01)
(52) U.S. Cl. ....................................... 280/276; 280/279
(58) Field of Classification Search .................. 280/274, 280/275, 276, 277, 278, 279, 288.3; 180/219
See application file for complete search history.

(56) References Cited

U.S. PATENT DOCUMENTS

| | | | |
|---|---|---|---|
| 4,854,412 A | | 8/1989 | Tidwell |
| 4,971,344 A | * | 11/1990 | Turner ........................ 280/276 |
| 5,626,355 A | * | 5/1997 | Voss et al. ..................... 280/276 |
| 5,653,007 A | * | 8/1997 | Boyer et al. .................... 29/460 |
| 6,612,600 B2 | * | 9/2003 | Devitt et al. ................. 280/288.3 |
| D494,108 S | * | 8/2004 | Liao .............................. D12/118 |
| 6,893,037 B1 | * | 5/2005 | Galasso ........................ 280/276 |
| 7,621,549 B2 | * | 11/2009 | van Houweling .......... 280/288.4 |
| 2003/0071400 A1 | * | 4/2003 | Graves et al. ............ 267/140.11 |
| 2009/0058039 A1 | * | 3/2009 | Mickelson .................... 280/276 |
| 2009/0072613 A1 | * | 3/2009 | Inoue et al. ................... 301/132 |
| 2010/0164200 A1 | * | 7/2010 | Lude et al. ................... 280/276 |

FOREIGN PATENT DOCUMENTS

| | | |
|---|---|---|
| DE | 899 444 | 4/1953 |
| DE | 195 31 844 A1 | 3/1997 |
| GB | 2 385 568 A | 8/2003 |

* cited by examiner

*Primary Examiner* — Paul N Dickson
*Assistant Examiner* — Tashiana Adams
(74) *Attorney, Agent, or Firm* — Greer, Burns & Crain, Ltd.

(57) ABSTRACT

A slider tube unit for a suspension fork of a bicycle, including two spaced-apart slider tubes and a wheel receiving space in-between, and at least one connector bracket connecting the two slider tubes above the wheel receiving space. The connector bracket includes a connector body which in its longitudinal extension from the one slider tube to the other slider tube is configured hollow wherein the connector body consists of an open basic profile and a reinforcing device closing the opening of the basic profile.

20 Claims, 5 Drawing Sheets

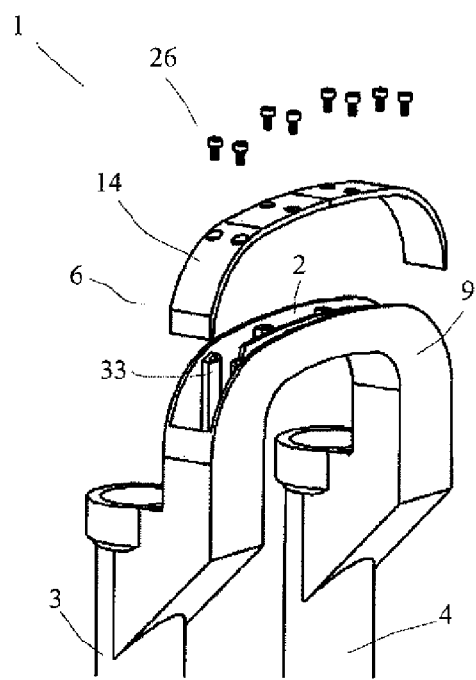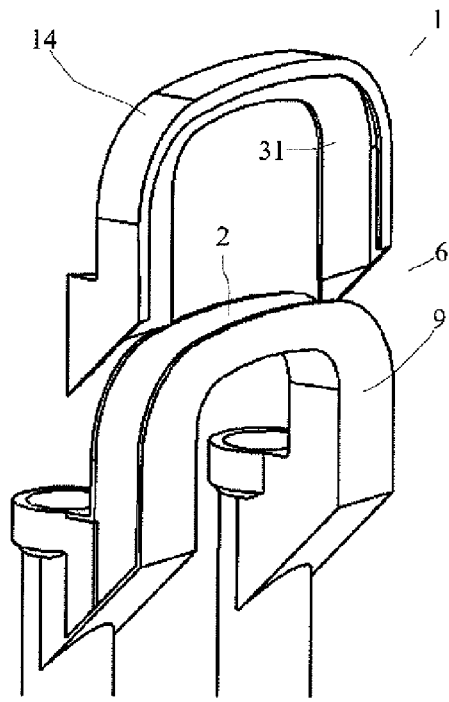
Fig. 7        Fig. 8
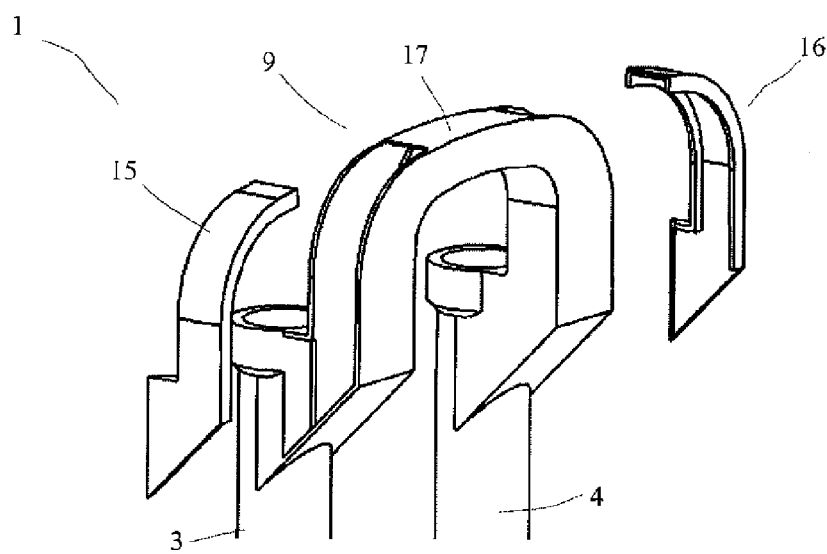
Fig. 9

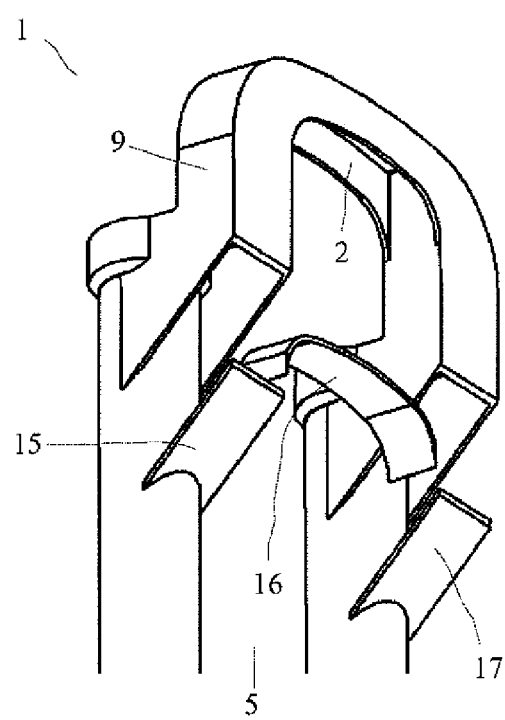
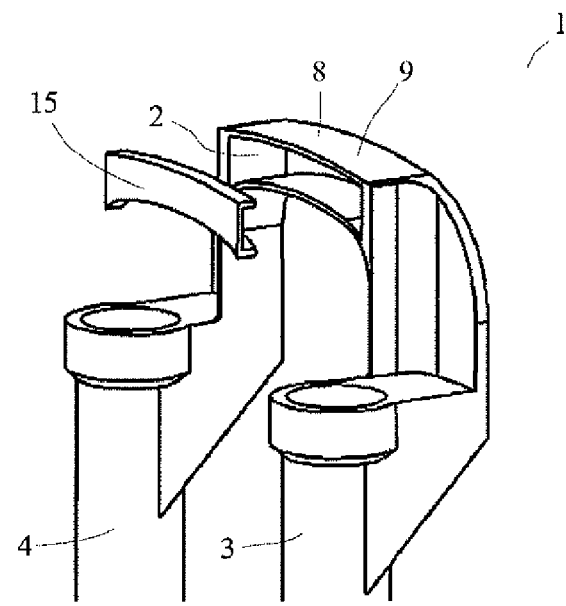
Fig. 10    Fig. 11
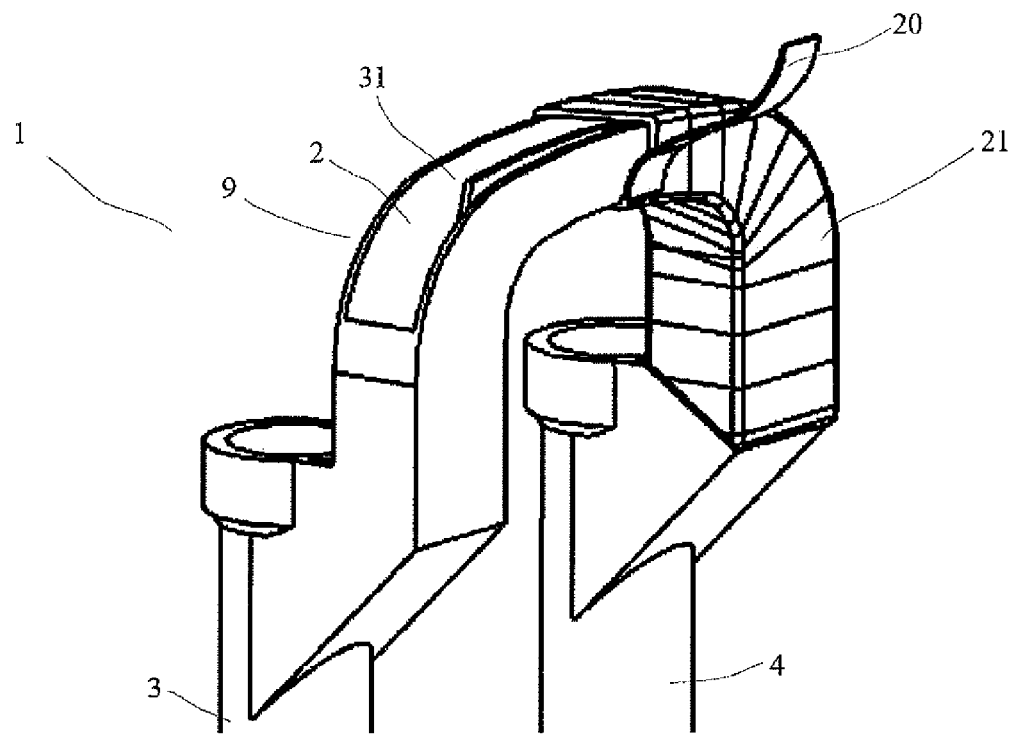
Fig. 12

SLIDER TUBE UNIT FOR A SUSPENSION FORK

BACKGROUND

The present invention relates to a slider tube unit for a suspension fork in particular of a bicycle and preferably a slider tube unit for a telescopic suspension fork.

Employing suspension forks in bicycles has basically been known for a long time. During the last few years, suspension forks have come to be installed, other than in downhill and mountain bikes and cross-country bikes, increasingly in everyday bicycles.

Most suspension forks comprise two tubes stationary relative to the bicycle frame, the so-called stanchion or inner tubes, and two lower, mobile tubes to which the wheel hub is fastened. The stanchion tubes are held together by means of a fork bridge or fork crown at the center of which the fork column is attached. The lower, mobile tubes are the so-called diving tubes or slider tubes, that are usually the outer tubes.

To be able to take up the loads occurring in riding, the slider tubes are often fixedly connected with one another through a connector bracket above the wheel receiving space which connector bracket is configured as a one- or double-sided, open profile to enable the production process in die-casting or forging. To further increase the high rigidity the e.g. U-shaped profile contains connector bridges which serve as reinforcement against torsional forces.

To be able to take up the loads occurring at the connecting point of the connector bridge with the two slider tubes, thickened material sections are provided there to prevent the slider tubes from breaking off.

These material accumulations and transverse bridges contribute considerably to the total weight which in present-day bicycles plays a decisive role.

With GB 2 385 568 B, a unitary slider tube unit for a bicycle fork has become known which on the whole entirely consists of a fiber-reinforced material. This known slider tube unit for a suspension fork achieves high stability and low weight.

A considerable drawback in the known slider tube unit for a suspension fork is, however, the complex production process wherein small and large strips and segments of a matrix-material impregnated, fiber-reinforced material must be manually placed one by one on a mold which must then be cured in an oven under defined conditions. Thus the manufacturing process for the known slider tube unit requires a great deal of time and furthermore only a very small number of slider tube units can be manufactured per day in one mold since due to processing, heating, and curing times, the required cooling-down time for the mold must be taken into account as well.

Against the background of the known prior art it is therefore the object of the present invention to provide a slider tube unit for a suspension fork in which high rigidity of the slider tube unit at a relatively low weight can be achieved in a simple manufacturing process.

SUMMARY

The slider tube unit according to the invention for a suspension fork is in particular provided to be used with a bicycle, comprising a pair of spaced apart slider tubes and a wheel receiving space in between. Furthermore at least one connector bracket is provided to connect the two slider tubes with one another above the wheel receiving space. The connector bracket comprises a connector body which in its longitudinal extension from one slider tube to the other slider tube is configured substantially hollow. The connector body consists of at least one open basic profile and at least one reinforcing device closing the opening of the basic profile.

The slider tube unit according to the invention has numerous advantages. One considerable advantage of the slider tube unit according to the invention is the connection of the two slider tubes by an in particular hollow connector body extending hollowly from the one to the other slider tube. This type of construction allows high rigidity and in particular high torsional rigidity of the two slider tubes relative to one another.

By means of the construction according to the invention in which the connector body consists of an open basic profile and a reinforcing device closing the opening of the basic profile, an overall closed, hollow connector body is formed which although it is configured in two- or multi-part configurations offers an extremely high load-bearing capacity.

Due to its construction the connector bracket of the slider tube unit according to the invention does not require any reinforcing ribs or walls intersecting the hollow space. Such reinforcements may be additionally provided as necessary.

Despite the hollow configuration of the connector body of the connector bracket the manufacturing process for the slider tube unit can be simple. In one casting process the two spaced-apart slider tubes and the basic profile of the connector bracket can be cast as a single piece such that the two slider tubes and the basic profile of the connector bracket are manufactured integrally. The open basic profile of the connector bracket is thereafter closed by a separate reinforcing device such that the connector bracket will have an overall hollow connector body which provides high rigidity. Manufacturing by forging is likewise conceivable.

By means of a pair of slider tubes integrally connected via an open basic profile, a particularly high stability and rigidity is achieved. No large material accumulation at the connecting points of the open basic profile with the slider tubes is necessary since the constant force flow between slider tube and connector body instead occurs via the hollow configuration of the entire unit.

The slider tube unit is in particular provided for a suspension fork configured as a telescopic suspension fork and is configured as a lower tube unit.

The connector bracket may generally be regarded as a connecting device and as a rule it will be a connector bridge or the like connecting the two slider tubes with one another. The connection may be configured as a substantially straight connecting device or as a connector bridge or it may be configured overall in the shape of a horseshoe or a U with the legs of the U extending in the longitudinal direction of the slider tubes.

In advantageous more specific embodiments the reinforcing device comprises at least one reinforcing profile. Such a reinforcing profile may be configured in different ways. In a simple case there is for example the option of a configuration as a thin plate which is adapted to the opening of the open basic profile so as to close the opening after being placed upon the basic profile opening.

In advantageous more specific embodiments the slider tubes and the basic profile are integral. There is also the option for the basic profile to only be configured integrally with one slider tube. It is then possible and preferred for the reinforcing device to be configured e.g. as a reinforcing profile and integrally manufactured with the other slider tube. In this case the basic profile and the reinforcing profile are preferably configured virtually symmetrically such that the basic profile and the reinforcing profile combined with the slider tubes overall form the slider tube unit.

Such a configuration comprises considerable advantages since the slider tube unit is manufactured by the joining of two approximately symmetrically configured components which are for example joined by way of any of the known methods. The particular components can be manufactured simply and efficiently in a casting process. Since large connecting surfaces are provided, defined material accumulations may be dispensed with so as to reduce the total weight.

Advantageously the slider tubes and/or the basic profile consist of a metal or a metallic alloy. The slider tubes or the basic profile consist in particular of a light metal or a light metal alloy. It is particularly preferred to use as the material, aluminum or magnesium or an alloy thereof.

In particular by employing light metals and particularly preferably by employing magnesium, high-strength and highly robust slider tube units are obtained which are configured to be highly stress-resistant due to the construction according to the invention wherein using the hollow connector body achieves low weight and simplicity of manufacture.

Preferably the reinforcing device and/or at least one reinforcing profile are manufactured at least in part of metal and in particular of a light metal or a light metal alloy. It is particularly preferred to employ for the reinforcing device on the whole or for at least one reinforcing profile, an aluminum alloy and particularly preferably a magnesium alloy. It is as well possible and preferred for the reinforcing device to consist of a fibrous composite material.

In all of the configurations the basic profile comprises a U-shaped internal cross-section. Or else the cross-section may be configured V-shaped or W-shaped or have a cross-section resembling such a shape. Such a basic profile allows high torsional rigidity in conjunction with the reinforcing device.

The reinforcing profile comprises in particular a flat or T-shaped or U-shaped cross-section to provide high torsional rigidity and resistance to stress of the slider tube unit.

All of the more specific embodiments may provide for the connector bracket to be on the front face. There is also the option for the connector bracket to be provided on the rear faces of the slider tubes. In a specific configuration a pair of connector brackets are provided one of which is arranged on the front face and the other, on the rear face of the slider tubes. In this way particularly high resistance to stress and rigidity are achieved.

The open basic profile may have its opening forwardly of the slider tubes or the basic profile is configured opened upwardly or downwardly in the direction of the dropout.

Particularly preferred configurations and more specific embodiments of the invention may provide several reinforcing profiles.

It is conceivable for the basic profile and the reinforcing profile or at least one reinforcing profile to be screwed to one another. In this way a reliable, firm connection is established which can be released as necessary.

It is also preferred to glue-fix the basic profile to the reinforcing profile or at least one reinforcing profile. By way of glue joints a reliable and durably safe connection can be established by simple means so as to meet high and highest levels of requirements.

In another particularly preferred configuration the basic profile is at least in part enveloped in at least one fiber-reinforced layer. Fiber-reinforced woven layers are in particular employed. It is also conceivable for single fibers to be wrapped around the basic profile which fibers are impregnated with a resin or matrix material or provided with such a matrix material after wrapping.

After these fiber-reinforced layers have cured there is a high-strength, torsionally rigid slider tube unit which particularly preferably comprises slider tubes made of metal and a basic profile consisting of metal wherein the reinforcing profile or the reinforcing device consists of a fiber-reinforced material.

Aside from employing woven layers and wrapping in single fibers it is as well conceivable to employ as reinforcing fibers, braided fibers, non-woven fabrics, cords, and the like.

In further preferred embodiments the slider tubes and the basic profile of the connector bracket are enveloped in fiber-reinforced layers. Such a configuration offers the advantage that the wall thickness of the metallic material of the slider tubes and the connector bracket can be reduced such that with the strength being maintained, material and weight can be saved overall.

Due to employing for the core of the slider tubes of the connector bracket, metallic materials manufactured industrially for example in a casting or forging process, the manufacturing process can be considerably simplified and automated as well.

In all the configurations and more specific embodiments of the slider tube unit the slider tubes are preferably provided for a sliding contact with the stanchion tubes of the suspension fork.

It is preferred to use the right-side-up configuration in which the thinner stanchion tubes fixed in the fork bridge of the suspension fork dip into the thicker slider tubes. Preferably the stanchion tubes are supported in the slider tubes by means of slide bearings.

In all of the configurations the lower ends of the slider tubes are preferably provided with one dropout each which are in particular provided to receive a wheel.

BRIEF DESCRIPTION OF THE DRAWINGS

Further advantages and applications of the present invention ensue from the description of exemplary embodiments which will now be discussed with reference to the enclosed figures.

The figures show in:

FIG. 7 the area of the connector bracket of a slider tube unit with screws provided from above;

FIG. 8 the area of the connector bracket of yet another slider tube unit;

FIG. 9 the area of the connector bracket of another slider tube unit before assembly;

FIG. 10 the area of the connector bracket of yet another slider tube unit before assembly;

FIG. 11 the area of the connector bracket of yet another slider tube unit before assembly;

FIG. 12 the connector area of another embodiment of a slider tube unit with the basic profile partially wrapped;

DETAILED DESCRIPTION

With reference to the enclosed figures, exemplary embodiments of slider tube units 1 for suspension forks 10 will now be explained. The suspension fork 10 illustrated in FIG. 1 is configured as a telescopic suspension fork 11.

Figures 1, 2:
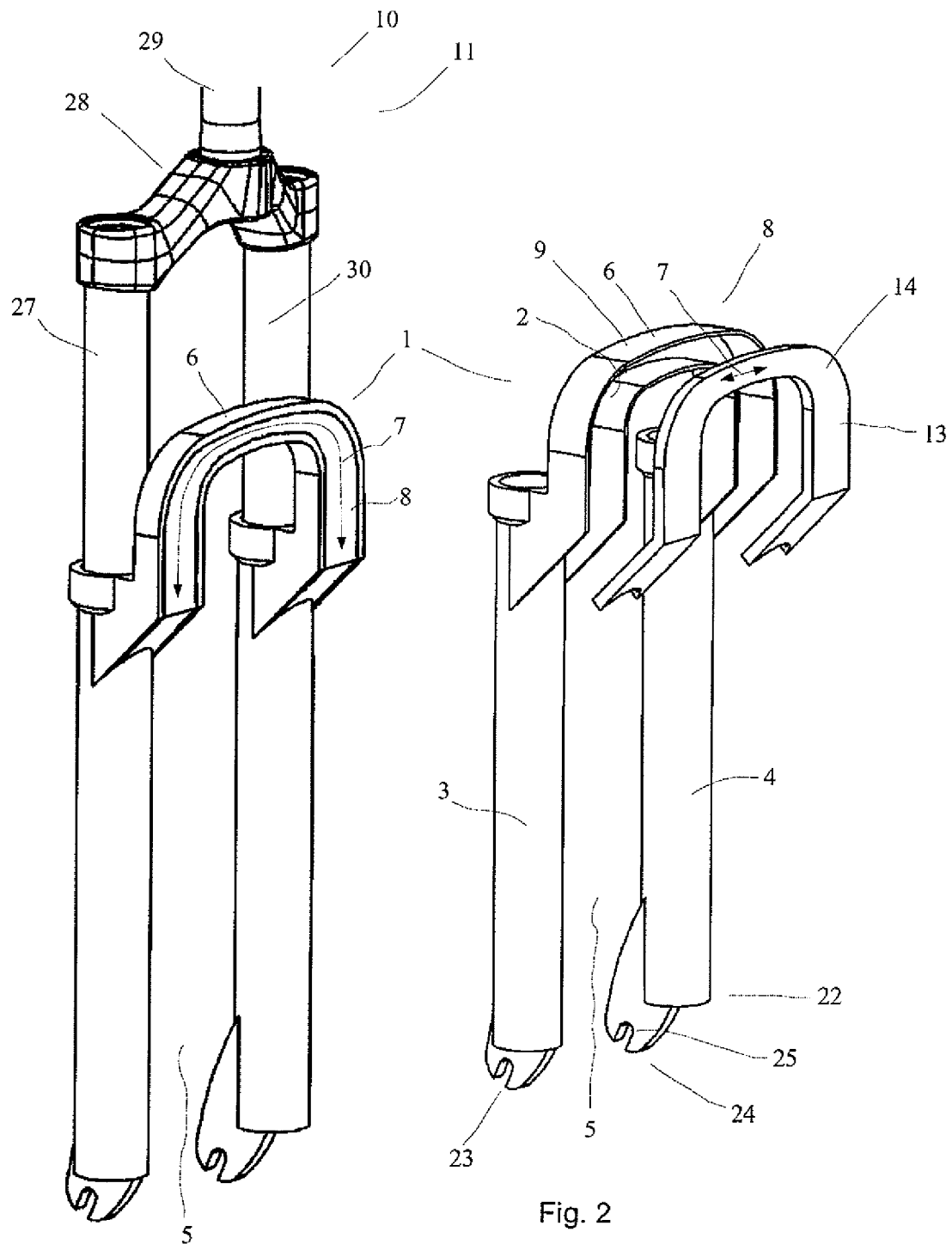
FIG. 1 a perspective view of a suspension fork with an inventive slider tube unit.
FIG. 2 a perspective view of the slider tube unit according to FIG. 1 before assembly.

In the upper area of FIG. 1 one can see the fork column 29 that is centrally fixed in the fork crown 28. The opposite ends of the fork crown 28 are followed downwardly by the respective stanchion tubes 27 and 30, that are configured as inner tubes. Slider tubes 3 and 4 are configured as outer tubes.

The suspension fork 10 is presently configured as a right-side-up suspension fork which means that the stanchion tubes 27 and 30 fixed to the fork crown 28 are smaller in their outer diameters than are the slider tubes 3 and 4 of the slider tube unit 1. In springing, the stanchion tubes 27 and 30 enter the slider tubes 3 and 4 of the slider tube unit 1 and they are slidingly supported in the slider tube unit 1 or in the slider tubes 3 and 4, respectively.

To increase stability the slider tubes 3 and 4 are connected with one another via a connector bracket 6 which in the exemplary embodiment according to the FIGS. 1 and 2 consists of a basic profile 9 and a reinforcing profile 14 that serves as the reinforcing device 13.

In this embodiment according to FIGS. 1 and 2 the stanchion tubes 3 and 4 and the basic profile 9 consist of a magnesium alloy and they are manufactured integrally in a casting process. Manufacturing in a casting process is permitted due to the open basic profile 9 which meets the requirements of flow directions and flow rates and which is suitable for manufacturing in a large-volume production process.

As can be clearly seen in FIG. 2, the hollow connector body 8 of the connector bracket 6 does not comprise a cross brace in its free cross-section as they are otherwise employed in known connector brackets of suspension forks to achieve the necessary rigidity. Presently the rigidity is established by the reinforcing profile 14 which closes the open basic profile 9 and which is firmly connected in assembly with the basic profile 9 of the connector bracket 6 to form a hollow connector body 8.

The connection of the basic profile 9 with the reinforcing device 13, which is presently configured as a reinforcing profile 14 in the shape of a substantially flat plate, preferably occurs in the embodiment according to FIGS. 1 and 2 through a glue-fixing method which reliably and reproducibly guarantees the durable stability required of such a suspension fork 10 or slider tube unit 1.

At the lower end 22 of the slider tube unit 1 the dropouts 23 and 24 are provided which are provided to receive the hub of a wheel (not shown).

Between the slider tubes 3 and 4 a wheel receiving space is provided beneath the connector bracket 6. When assembled completely, the wheel is rotatably received therein.

The opening 2 of the basic profile 9 in the embodiment according to FIG. 2 is oriented rearwardly before the final assembly.

The basic profile 9 in the embodiment according to FIGS. 1 and 2 is provided with an approximately U-shaped cross-section, wherein the basic profile 9 is again configured approximately U-shaped in a view from the rear. The legs of the U extend in the direction of the slider tubes 3 and 4.

Differently from the illustration according to FIG. 2 the reinforcing profile 14 may consist not only of one single reinforcing plate but it may comprise a number of components which are connected with one another or at the same time also with the open basic profile 9 to complete the slider tube unit 1.

Figure 3:
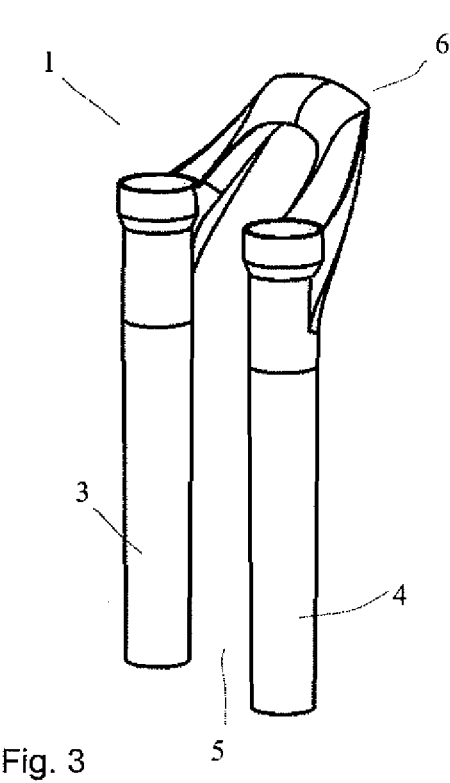
FIG. 3 a perspective view of the connector bracket area of another slider tube unit.
Figure 4:
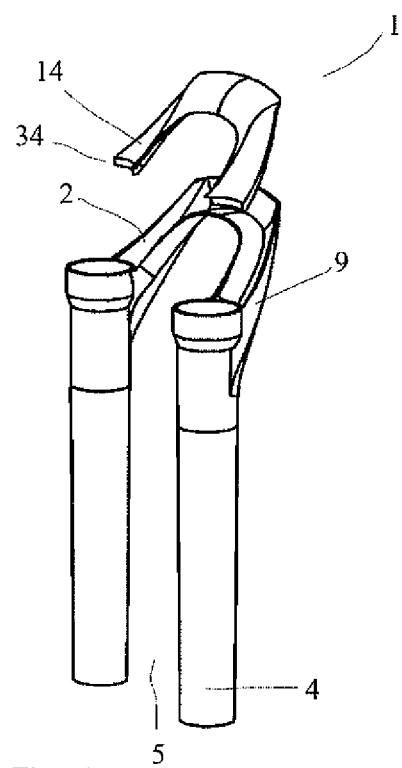
FIG. 4 a perspective view of the connector bracket area with the slider tube unit according to FIG. 3 before assembly.

FIGS. 3 and 4 illustrate a second embodiment in which differently from the illustration in FIG. 2 the opening of the open basic profile is oriented upwardly before the final assembly.

In FIG. 4 the slider tube unit 1 according to FIG. 3 is illustrated before final assembly wherein the reinforcing profile 14 is illustrated shortly prior to being attached to the basic profile 9. In the embodiment according to the FIGS. 3 and 4 the basic profile 9 is again formed integrally with the slider tubes 3 and 4, preferably consisting of a light metal alloy and in particular of a magnesium alloy. Manufacturing preferably occurs in a casting process.

The reinforcing profile 14 also comprises a U-shaped cross-section transverse to its longitudinal direction 7 to achieve yet higher rigidity and to provide a larger adhesive surface between reinforcing profile 14 and the basic profile 9. All around the reinforcing profile 14 a bridge 34 is provided projecting a few millimeters downwardly from the approximately flat surface of the reinforcing profile 14 and when attached, dips into the basic profile 9. By means of the bridge 34 an enlarged adhesive surface is provided and rigidity increases yet again.

The basic body 9 and the reinforcing profile 14 of the connector bracket 6 are oriented inclined upwardly so as to achieve an attractive configuration, high stability and functionality.

Figure 5:
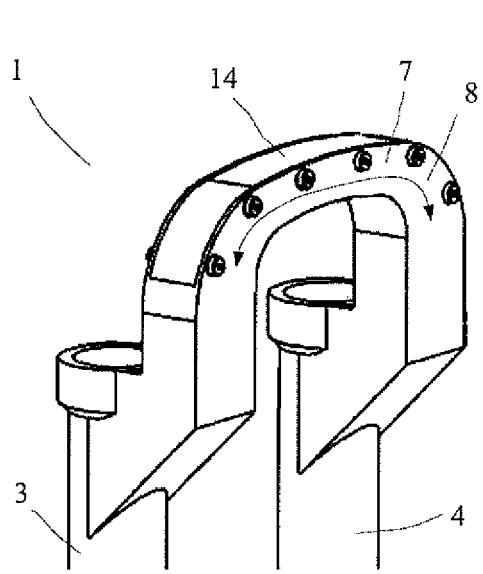
FIG. 5 a perspective view of a connector area of another slider tube unit.
Figure 6:
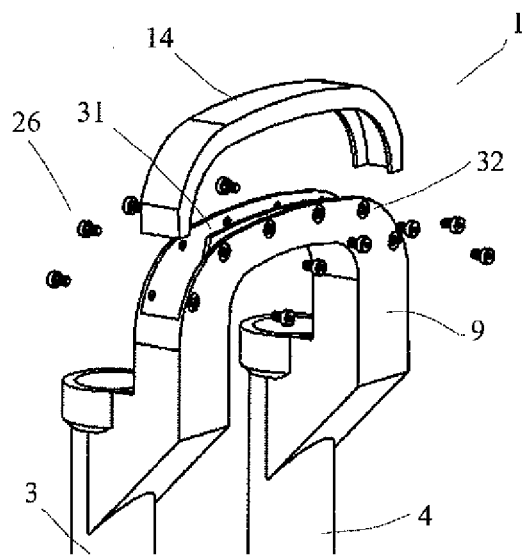
FIG. 6 a view of the slider tube unit according to FIG. 5 before assembly.

In the embodiment according to the FIGS. 5 and 6 the structure of the slider tube unit 1 used is basically similar to that in the embodiment according to FIGS. 3 and 4.

Unlike the preceding embodiments the reinforcing profile 14 is presently connected with the basic profile 9, not by a glue-fixing method but by screws 26 which are presently screwed from the front or rear face of the slider tube unit 1 into respective threaded holes 32 of the slider profile.

FIG. 7 shows in a perspective view the region of the connector bracket 6 shortly prior to mounting the reinforcing profile 14 to the basic profile 9. Presently the basic profile 9 is provided with an opening 2 directed upwardly such that the basic profile 9 has an upwardly open cross-section. Additionally for example bridges may be provided oriented perpendicularly at the basic profile side walls to achieve an additional increase of rigidity and stability.

As can be taken from FIG. 6, a reinforcing rib 31 is provided at the basic profile 9 in the opening 2 of the basic profile 9 in the center between the two side walls which additionally increases rigidity. Presently the basic profile 9 receives an approximately W-shaped cross-section. Such a reinforcing rib 31 may as well be provided in the previously described embodiments.

As illustrated in FIG. 7, screws 26 may be provided from above to screw the reinforcing profile 14 to the basic profile 9. Or else it is conceivable to use an adhesive, additionally or instead of employing screws 26, to establish the connection. The basic profile 9 comprises ribs or bridges 33 oriented approximately in the perpendicular and contributing to reinforcement.

FIG. 8 shows the area of the connector bracket 6 prior to connecting the basic profile 9 with the reinforcing profile 14. This reinforcing profile 14 comprises a plane covering surface and a T-shaped cross-section.

Connecting the reinforcing profile 14 with the basic profile 9 occurs in particular by way of a glue-fixing method. Optionally the reinforcing profile 14 may be soldered or welded to a basic profile 9.

FIG. 9 shows a variant of the embodiment according to FIG. 8 wherein presently two reinforcing profiles 15 and 16 and optionally a third reinforcing profile 17 may be provided.

In FIG. 9 a reinforcing profile 17 is drawn at the basic profile 9, arranged on top in the center between the two slider tubes 3 and 4. Optionally the component presently shown at 17 may be configured integrally with the basic profile 9 and the two slider tubes 3 and 4 and for example manufactured in a casting process.

In assembling, the reinforcing profiles 15 and 16 are connected with the basic profile 9 such that the connector bracket 6 comprises a hollow connector body 8.

In FIG. 10 the basic profile 9 comprises a downwardly oriented opening 2. To close the open basic profile 9, three reinforcing profiles 15, 16, and 17 are placed on the respective openings 2 from below and connected with the basic profile 9 for example by glue-fixing.

FIG. 11 shows a variant in which the opening 2 of the basic profile 9 is oriented from the connector bracket 6 in the direction of the slider tubes 3 and 4. In assembling, the reinforcing profile 15 is placed on the opening 2 of the basic profile 9 and connected thereto such that the hollow connector body 8 of the connector bracket 6 is formed.

FIG. 12 shows another preferred variant of a slider tube unit 1 for a suspension fork 10, with this slider tube unit 1 overall consisting of at least two different materials. Preferably the slider tubes 3 and 4 are manufactured integrally with the basic profile 9 of the connector bracket 6 from a metallic alloy for example by a casting process. The rib 31 recognizable in the opening 2 of the basic profile may be provided as a reinforcement.

To close the opening 2, a reinforcing device 13 consisting of fiber-reinforced layers 20 is presently employed.

In the illustrated embodiment, woven fiber layers or woven mats are wrapped around the basic profile 9 to close the opening 2. The woven mats may be configured as so-called prepregs, or wrapped around the basic profile as dry reinforcement fibers and subsequently coated with a reinforcing resin or the like.

Preferably the reinforcing layer is wrapped around the basic profile 9 at least twofold and in particular multiple times. The winding may be partly overlapping in every layer.

In further embodiments it is conceivable to wrap the slider tubes in a fiber-reinforced material such that a reduction of the wall thicknesses of the slider tubes 3 and 4 is optionally possible without diminishing the advantages of the present construction since the integral manufacture of the basic profile 9 and the slider tubes 3 and 4 allow easy wrapping in fiber mats as well.

After curing in an oven or the like the component is finished, providing a simply manufactured, robust yet lightweight slider tube unit for a suspension fork 10.

Figure 13:
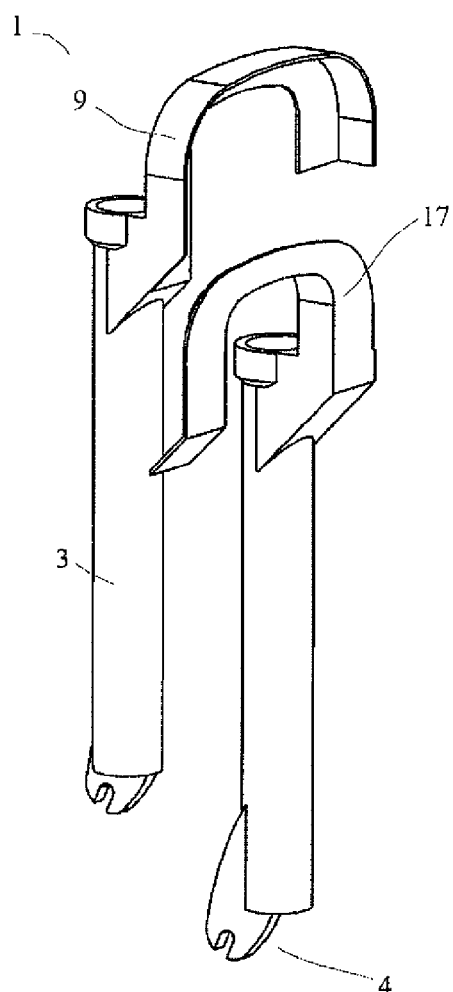
FIG. 13 a two-piece slider tube unit before joining.

In the embodiment illustrated in FIG. 13, slider tubes 3 and 4 are manufactured with a basic profile 9 or reinforcing profile 17 cast integrally therewith. Subsequently the two components are connected with one another in a glue-fixing process. The large connection area allows a particularly robust construction.

Figure 14:
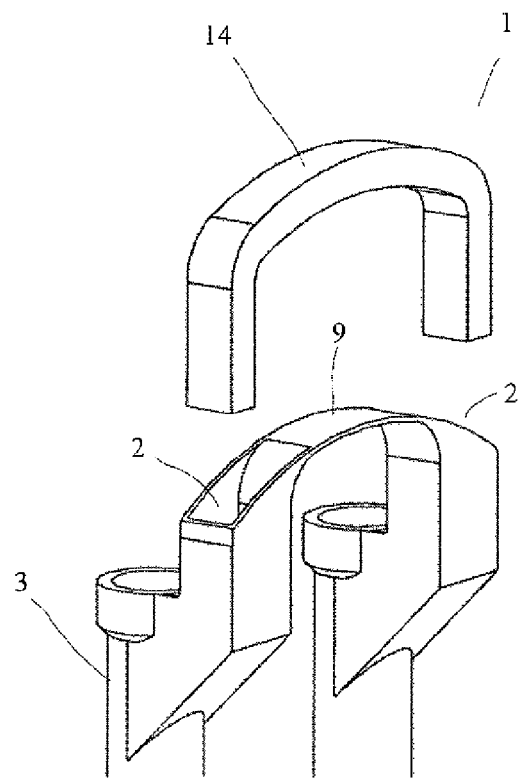
FIG. 14 the connector area of another slider tube unit.

The embodiment illustrated in FIG. 14 comprises a basic profile 9 with two upwardly oriented openings 2 which are closed by a reinforcing profile 14. This reinforcing profile is square in cross-section and is on the whole configured approximately U-shaped for the two legs of the U to dip into the openings 2 of the basic profile 9. Other shapes of cross-sections are conceivable as well. Joining again occurs in particular in a glue-fixing process.

Figure 15:
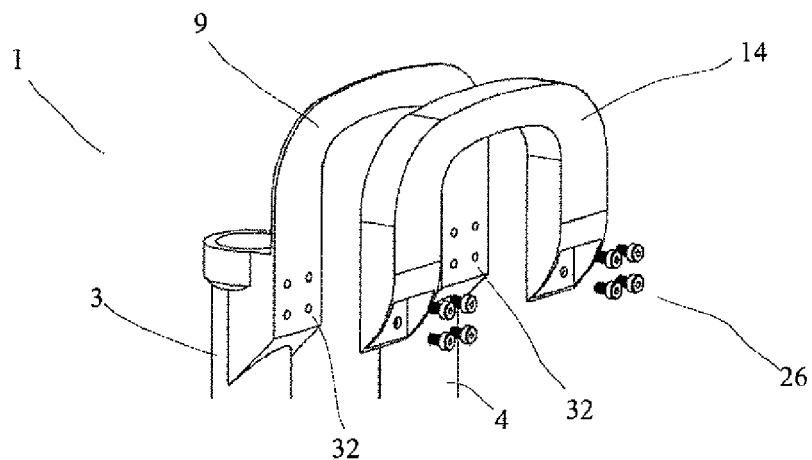
FIG. 15 yet another connector area of another slider tube unit.

FIG. 15 shows an embodiment in which the basic profile 9 is configured as a flat strip which is manufactured in particular integrally with the slider tubes 3 and 4. A square profile overall bent to form a U is attached by screws 26 to threaded holes 32 of the basic profile 9. An adhesive may additionally be spread onto even surfaces to increase the strength of the connection.

On the whole the invention provides a slider tube unit 1 and a suspension fork 10 which are simple in manufacture. A low total weight at high rigidity is achieved. By employing metallic alloys and a casting process, a manufacturing process suitable for large-volume production is provided which reduces costs.

While a particular embodiment of the present slider tube unit for a suspension fork has been described herein, it will be appreciated by those skilled in the art that changes and modifications may be made thereto without departing from the invention in its broader aspects and as set forth in the following claims.

The invention claimed is:

1. A slider tube unit for a suspension fork, of a bicycle, the slider tube unit comprising:
   two spaced-apart slider tubes defining a wheel receiving space in-between;
   at least one connector bracket connecting the two slider tubes above the wheel receiving space, the connector bracket comprises a connector body configured substantially hollow in its longitudinal extension from the one slider tube to the other slider tube, and including at least one open basic profile and a reinforcing device closing the opening of the basic profile, wherein said slider tubes and said basic profile are integral.

2. The slider tube unit according to claim 1, wherein the reinforcing device comprises a reinforcing profile.

3. The slider tube unit according to claim 1, wherein at least one of the slider tubes and the basic profile are made of a light metal.

4. The slider tube unit according to claim 2, wherein at least one of the reinforcing device and the reinforcing profile are made of a light metal.

5. The slider tube unit according to claim 1, wherein the basic profile comprises a U-shaped cross-section.

6. The slider tube unit according to claim 1, wherein the reinforcing profile comprises a substantially flat or T-shaped cross-section.

7. The slider tube unit according to claim 1, wherein the connector bracket is provided at a front face.

8. The slider tube unit according to claim 1, wherein the connector bracket is provided at a rear face.

9. The slider tube unit according to claim 1, wherein one connector bracket is provided at a front face and one connector bracket, at a rear face.

10. The slider tube unit according to claim 1, wherein the basic profile is forwardly open.

11. The slider tube unit according to claim 1, wherein the basic profile is upwardly or downwardly open.

12. The slider tube unit according to claim 1, wherein the basic profile and the reinforcing profile are configured symmetrical and each is attached to one of the slider tubes.

13. The slider tube unit according to claim 1, wherein several reinforcing profiles are provided.

14. The slider tube unit according to claim 1, wherein the basic profile and the reinforcing profile are screwed to one another.

15. The slider tube unit according to claim 1, wherein the basic profile and the reinforcing profile are glue-fixed to one another.

16. The slider tube unit according to claim 1, wherein the basic profile is enveloped in fiber-reinforced layers.

17. The slider tube unit according to claim 1, wherein the reinforcing profile consists of a fibrous composite material.

18. The slider tube unit according to claim 1, wherein the slider tubes are provided for a sliding contact with stanchion tubes of the suspension fork.

19. The slider tube unit according to claim 1, wherein lower ends of the slider tubes are each provided with one dropout.

20. The slider tube unit according to claim 1, wherein lower ends of the slider tubes are each provided with a receiving device for a wheel.

* * * * *